Figure 1:
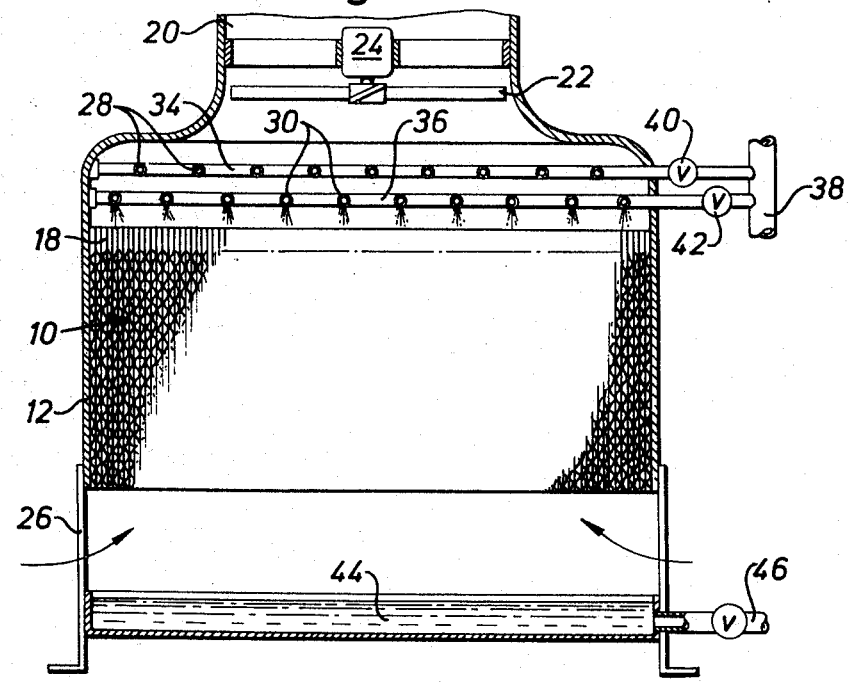

United States Patent [19]

Hallgren

[11] 3,997,635
[45] Dec. 14, 1976

[54] METHOD AND DEVICE FOR EVAPORATIVE COOLING

[75] Inventor: Karl A. Hallgren, Huddinge, Sweden

[73] Assignee: Aktiebolaget Carl Munters, Sollentuna, Sweden

[22] Filed: Aug. 28, 1975

[21] Appl. No.: 608,694

[30] Foreign Application Priority Data

Sept. 2, 1974  Sweden .......................... 7411088

[52] U.S. Cl. .................... 261/161; 261/DIG. 11; 261/DIG. 77; 261/112
[51] Int. Cl.$^2$ ...................... F28C 1/02; F28C 1/04
[58] Field of Search ............ 261/DIG. 77, DIG. 11, 261/112, 159, 161

[56] References Cited

UNITED STATES PATENTS

| | | | |
|---|---|---|---|
| 1,987,881 | 1/1935 | Seggren et al. ............ | 261/DIG. 11 |
| 3,415,502 | 12/1968 | Munters ..................... | 261/DIG. 11 |
| 3,526,393 | 9/1970 | Meek ........................... | 261/DIG. 11 |
| 3,795,388 | 3/1974 | Toth ............................. | 261/112 |
| 3,844,344 | 10/1974 | Kliemann et al. .......... | 261/DIG. 11 |
| 3,846,519 | 11/1974 | Spangemacher ........... | 261/DIG. 77 |
| 3,887,666 | 6/1975 | Heller et al. ................ | 261/DIG. 11 |

Primary Examiner—Tim R. Miles
Assistant Examiner—Gregory N. Clements
Attorney, Agent, or Firm—John A. Mitchell; Pasquale A. Razzano

[57] ABSTRACT

The invention relates to a method and a device for preventing formation of mist by the discharge of moistened air from an evaporative cooler, primarily a cooling tower of the multi-layer type, comprising a contact body composed of a plurality of layers forming between themselves gaps passed by water to be cooled and atmospheric air which is moistened and heated by contact with the water in counter-current or cross-current flow. Under certain conditions as when the temperature of the atmospheric air is so low, when the moistened and heated air is discharged to the atmosphere and cooled to the low temperature of the latter, the moisture contained in the discharged air will be condensed and precipitated in the form of mist to the extent it exceeds the saturation point of the air. Such precipitation can be avoided by mixing the moistened air prior to its escape into the atmosphere with preheated dry air. The invention provides a novel method and device for producing such preheated dry air by causing part of the introduced atmospheric air to pass through gaps of the contact body shut off from the flow of water passing through the body, whereby this air is heated without change of its mositure content by heat exchange with the warm water flowing through adjacent gaps. The moist air current from the gaps wetted by the water flowing through them and the dry air current from the gaps not accessible to the water provided an air mixture which, even when discharged into the relatively cold atmospheric air and thereby cooled to the low temperature thereof, will not contain so much moisture that the saturation limit is surpassed and condensed vapor precipitated. Means are also disclosed to adjust the ratio of the gaps open to the water flow to the gaps shut off from said flow so as to reduce the number of dry gaps in which no cooling effect is produced to the minimum necessary for avoiding mist formation.

7 Claims, 5 Drawing Figures

METHOD AND DEVICE FOR EVAPORATIVE COOLING

The present invention relates to a evaporative coolers, such as cooling towers, which comprise a contact body of the multi-layer type, housed within a casing, and having gaps existing between the layers of the body. Warm water and a current of atmospheric air are simultaneously passed in the body gaps to prevent formation of mist in relatively cold weather by condensation of steam or vapor on return of the air current into the atmosphere. In this connection the phrase multi-layer type is understood to mean that the contact body is composed of generally parallel layers which between themselves form channels or gaps extending from end to end of the contact body. The water is supplied to the gaps of the contact body from above and the air can be conducted through the gaps either in counter-current or in cross-current. The cooling of the water is effected substantially be evaporation into the air streaming in the channel so that the vapor content of the air is increased.

Cooling towers are required primarily in summer but it happens often also that they shall be in operation during other seasons, i.e. when the air temperature is relatively low. This is the case, for example, with the removal of heat from the compressors of cold-storage plants or with steam turbine plants for production of electric energy and also with various process industries. Relatively cold weather according to the above is thus understood to mean that the atmospheric air has so low a temperature that the moist air generated in the cooling tower on discharge into the atmosphere forms mist clouds by condensation of steam. It is known that such formation of mist annoying the surroundings can be counteracted by heating the moist air passing through the cooling tower after passage over the evaporative surfaces or by mixing it with another air stream of atmospheric air which has beem preheated in a separate heater. In both these cases the air thus obtained, when it is returned into the atmosphere has so low a relative moisture content that condensation is avoided. This is done, however, at the cost of expensive and space requiring devices in the shape of air heaters, valves and, if necessary, additional air channels and dampers. Since the problem with formation of mist often exists during a limited period of the year only, the additional cost for such devices constitutes an unproportionally heavy burden for the short time of operation which is in question. The additional costs present themselves partly in higher investment expenses and partly in higher costs of operation due to the increased blower work which such devices involve, not only during the periods of mist formation, but during the whole time of operation of the cooling tower.

The invention relates to a method and a device which are capable of effectively preventing formation of mist in the escaping cooling tower air without application of separate air heaters. Furthermore, the invention relates to a method and a device which prevent formation of mist when this is necessary, but which also renders possible full utilization of the evaporative capacity of the cooling tower during the warmer season when the demand of cooling capacity is the greatest. This is obtained evaporative the cooler fill of the cooling tower being formed in such a manner that some of its gaps can be switched off from supply of water, whereas adjacent gaps remain wetted with water. Then in the dried channels or gaps the air passing through said channels will be heated by the heat conductive contact with the water layer in the adjacent gaps, whereas the air in the gaps wetted with water is imparted an increased moisture content by the direct contact with the water film in these gaps. Thus the cooling tower fill is passed by alternating dry, preheated air currents and wetted air currents. After the passage of the air currents through the fill, there is obtained a mixture state of such nature that the mixed air when returning into the atmosphere does not generate any mist. When formation of mist no longer must be feared or when the risk is reduced substantially, the gaps in the contact body which earlier served only for heating of atmospheric air can be joined with the system so that they also are supplied with water and the cooling tower then attains maximum capacity.

The contact body can be built up in various manners such as of plane layers the positions of which relative one another are secured by means of spacing members or the layers themselves may account for the interlocation by being corrugated or in other ways formed with bulges which bear against one another. Most suitably the material should be of such a kind that when it on the one side is passed by both water and air and on the other side by air only it is to an essential degree impermeable to the liquid medium. The layers may be of plastic or fibrous material which by impregnation has been imparted wet strength or impermeability to water.

The invention is applicable also to evaporative coolers of that kind in which the medium which is to be cooled and which passes through the cooler is separated from the air and water currents. In this connection said medium is conducted through pipes provided with flanges similar to so-called finned pipes. The layers of the contact body according to the invention are then constituted by said flanges which are in heat conductive connection with the medium advancing in the pipes.

The invention shall hereinafter be described with reference to embodiments shown by way of example in the accompanying drawings, further features characterizing the invention being indicated in this connection also.

In FIG. 1, there is shown diagrammatically a vertical section through a cooling tower of countercurrent type and constructed according to the invention.

Figure 2:
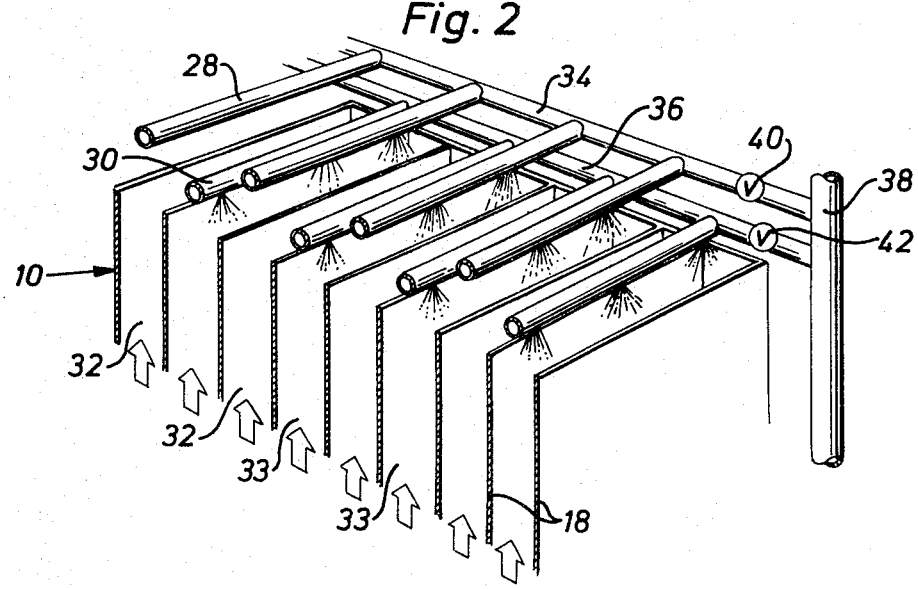

In FIG. 2, there is shown a portion of the tower in perspective and on a larger scale.

Figure 3:
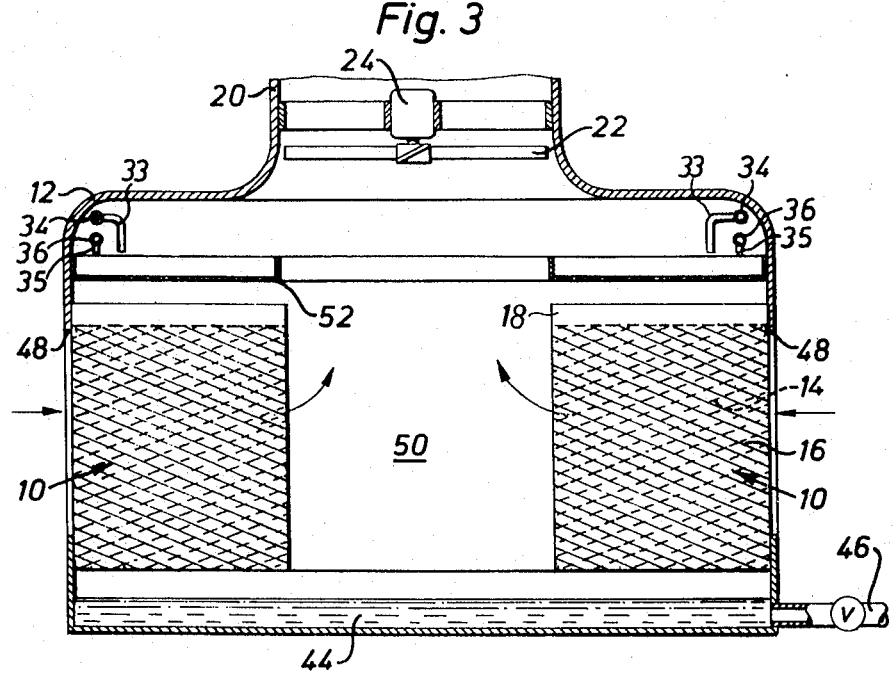
Figure 4:
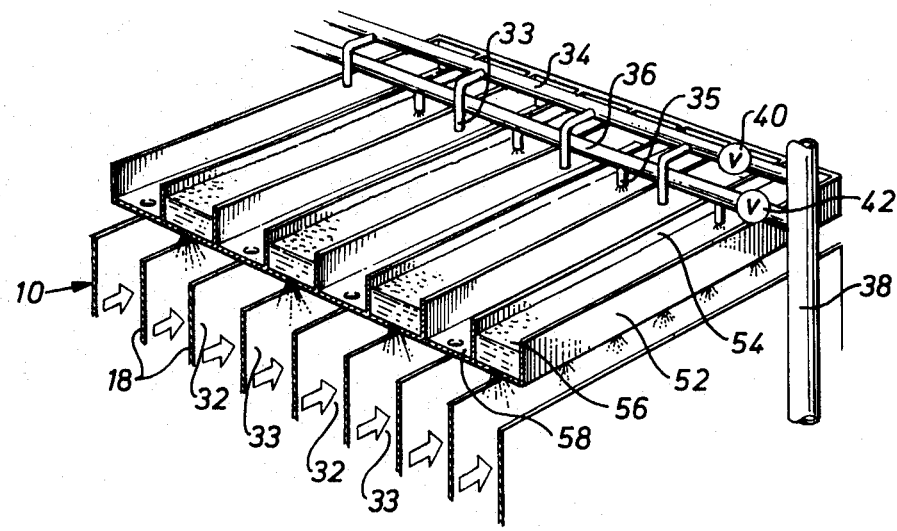

In FIGS. 3 and 4 there is illustrated in a corresponding manner another embodiment of a cooling tower operated according to the cross-current principle.

Figure 5:
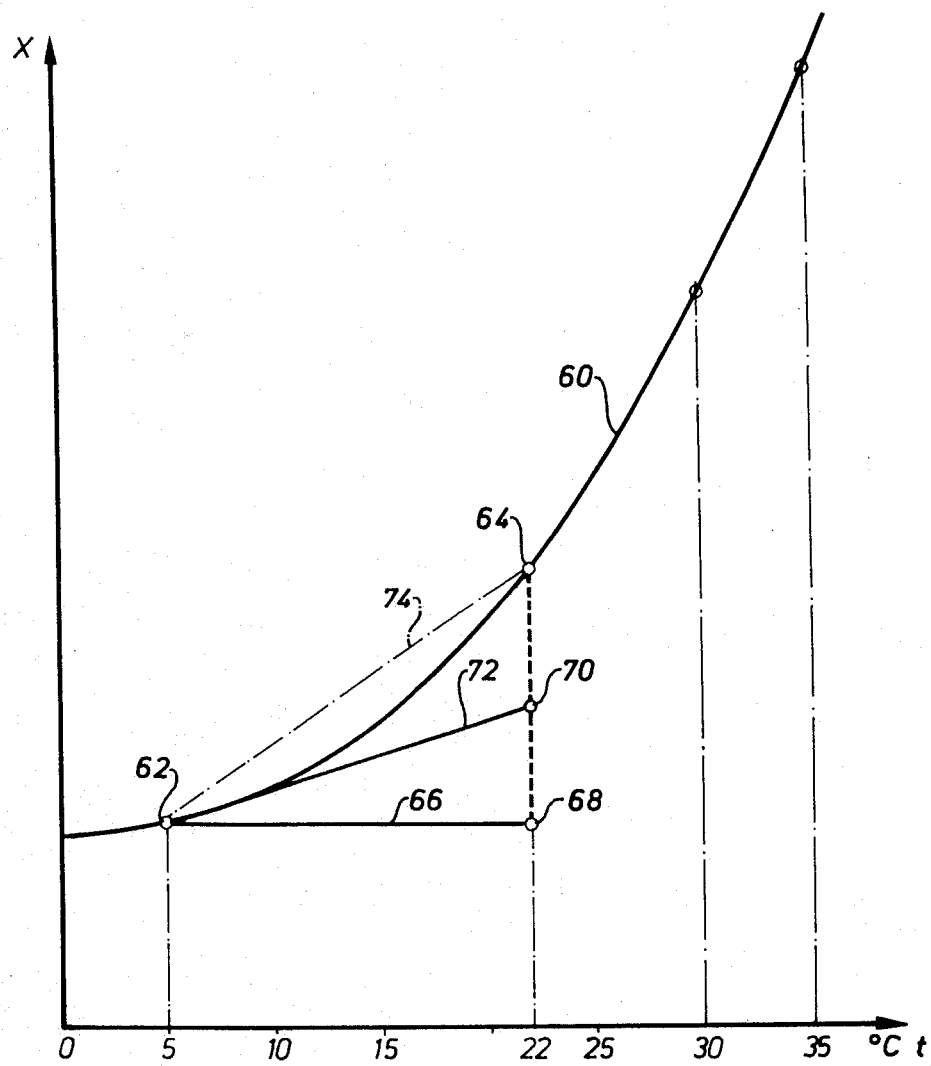

In FIG. 5 finally, there is shown a psychometric graph.

In the FIGS. 10 denotes a contact body which is enclosed within a casing 12 and which is composed of layers or sheets which are disposed in parallel so that between them vertical or standing gaps or channels are formed. In the shown embodiments the layers are all corrugated with the corrugations crossing one another in every second layer as is indicated at 14 and 16 in FIG. 3. All corrugations extend with an angle to the vertical and bear against one another at the pointwise distributed places of contact. This structure is known from e.g. the U.S. Pat. Nos. 3,682,747 and 3,415,502. The medium spacing between the layers, i.e. the height of the corrugations may vary between 10 and 50 mms and suitably be within the limits of 12 – 30 mms. The layers may be of plastic or other material which is scarcely permeable to water and which is of a thickness from several tenths of one mm up to several mms. In the embodiments the corrugated structure at its top merges into a portion 18 where the layers are planar or flat.

The casing 12 has at its top a discharge opening 20 within which is provided an impeller 22 which is driven by a motor 24. Furthermore there are provided at the top distributors for water as shall be described further below.

In the embodiment according to FIGS. 1 and 2 the casing 12 has lateral openings 26 for atmospheric air located below the contact body 10 which air by the fan 22 is caused to flow in a mainly vertical direction upwards through the channels of the contact body. The water distributing system comprises in the embodiment two groups of pipes 28, 30 which alternately extend in parallel with the layers or their portions 18 respectively and are located straight opposite above the associated interspaces 32 and 33, respectively, between the layers. In the interest of clarity some few pipes 28, 30 only have been indicated in FIG. 1. The pipes are at the underside formed with discharge holes for the water. The two pipe groups are situated at different levels in order not to throttle the air flow and are connected each to an associated distributor pipe 34 and 36, respectively, which are supplied with the water to be cooled from a suitably common duct 38. Arranged in the distributor pipe 34 is a stop or control valve 40. In the pipe 36 also a valve 42 may be provided. The water flows in downward direction through the gaps and meets in countercurrent the upwards advancing air, the water being cooled and the air taking up moisture unit saturation is reached.

If now the temperature of the cooling water when entering the tower is so high in relation to that of the atmospheric air that the escaping saturated air when returning into the atmosphere should precipitate steam in the form of clouds of mist, one group of gap pipes 28 is shut off so that water is supplied only to the lower group of pipes 30 and therewith to every second gap between the layers of the contact body. This results in that the atmospheric air which passes through the gaps 32 comes to indirect exchange only with the water which passes inside the intermediate gaps 33 for which reason this air is heated without its absolute moisture content being changed and, whereby its relative moisture content declines. In this way two air currents of different absolute and relative moisture content will pass through the contact body to be intermixed before they escape into the atmosphere. The air current only heated and/or dried is adjusted to its quantity so that the air mixture is imparted a sufficiently low relative moisture content as when it is mixed with the outer air continuously to be above the condensation point of the vapor.

The cold water is collected in a sump 44 at the bottom of the tower and is discharged through a duct 46 to the place of utilization. Here it is heated anew and returns thereafter to the cooling tower through the duct 38.

In the embodiment according to FIGS. 3 and 4 the cooling tower is formed for cross-current water-air flow, which means that the water, as before, flows in a vertical main direction downwards, the air is introduced through openings 48 in the lateral walls of the casing 12 and passes the gaps of the two contact bodies 10 in mainly horizontal direction, escapes into a mixing chamber 50 and is sucked out therefrom by the fan 22. In this case the distributor system comprises boxes 52 which by partitions 54 are subdivided into narrow troughs 56, 58, which are parallel with the layers in the contact body and located straight opposite above their gaps 32 or 33, respectively. Each second trough 56 is fed with the warm cooling water through branch pipes 35 from the common pipe 36 and each second trough 58 through branch pipes 37 from the pipe 34. The pipe 34 and the pipe 36 are in the same manner as before via a valve 40 or 42, respectively, connected with the common main duct 38. In FIG. 4 the troughs 56 only are filled with water whereas the supply pipes to the troughs 58 are shut off. This results in that each second gap is passed by both water and air so that the water is cooled under increase of the moisture content of the air. In each second gap, however, an indirect cooling of the water or heating of the air only is effected through the layer walls in the same manner as described above. This answers to the conditions of operation in relatively cold weather.

When the air temperature rises and no formation of mist is to be feared, the supply of warm water through the troughs 58 also is opened. Then the cooling tower attains substantially greater cooling capacity and therewith meets the greater demands to capacity which are associated with warmer weather.

The course of operation of the cooling towers in cold weather is represented in FIG. 5, wherein the ordinate $x$ of the graph represents the absolute vapor content of the air, for example in g per kg of air, and the abscissa $t$ represents the temperature of the air. The curve 60 shows the moisture content of the air when saturated, i.e. when the relative moisture content is 100%. The temperature of the atmospheric air is assumed to be 5° C and furthermore said air is saturated or almost saturated, for which reason the condition is represented by point 62 on curve 60. The warm water to be cooled enters the contact body with a temperature of 35° and shall be cooled to 30°. The change of condition of the entering atmospheric air within the wet gaps or channels 33 is assumed at the outlet from the gaps to reach point 64 which corresponds to a temperature of 22°. In these gaps an evaporation of water into the air takes place so that the air follows the saturation curve from point 62 to point 64. In the dry channels 32 a heating only of the atmospheric air is effected while its moisture content remains constant. The change of condition of this air current thus follows line 66 which is parallel with the abscissa and the air is assumed to reach the same final temperature as the wet air, i.e. 22° according to point 68 at which the relative moisture content is about 35%. If, as in the embodiments, every second channel is wet and every second channel dry, approximately equally great quantities of air will reach the condition 64 and the condition 68, respecitvely. When the two air masses are mixed with one another the mixture attains the condition according to point 70 on the temperature line 22 located right between the points 64 and 68. When thereupon the mixture is discharged again into the atmosphere, it will be cooled down according to line 72 to the assumed temperature of 5°. It is evident from the graph that the line 72 does not intersect the saturation curve 60 and this means that condensation of vapor will not take place. If, however, the moist air according to point 64 should have been allowed solely to escape into the atmosphere it should have been cooled according to imaginary line 74 which is located above the saturation curve 60 which is not possible, for which reason vapor must condensate simultaneously as the air is cooled down along the saturation curve 60 between the points 64 and 62.

Obviously, the invention is not limited to the shown embodiments, but may be varied in many respects within the scope of the basic idea thereof. Thus, a number of channels in the contact body which are intended for generation of the dry heated air may be less than stated above so that e.g. each third or fourth channel only is aimed therefor. Furthermore, one may have more than two water supply systems coupled in parallel so that the number of dry channels can be changed gradually.

It is of essential importance that one can bring about both dry and moist air currents within one and the same contact body. No space and expences requiring air heaters are necessary, and the fan work is reduced to a minimum. It is equally important that one is in a position with simple means to adjust the distribution of dry and moist air streams according to the climatic conditions so that one during the hotest period can utilize all surfaces for the evaporation effective from the view point of cooling. The dry and moist air currents leaving the alternate gaps of the fill body will be intermixed effectively before they again enter the atmosphere. In this way one avoids the danger of stratifying of air of different conditions which could result in local formation of mist even where the average conditions appear to result in mist-free discharge.

I claim:

1. A method of evaporative cooling for use with an evaporative cooler consisting of a cooling tower including a multi-layer contact body having gaps between the layers in which the formation of mist by condensation of vapor on return of the cooling air to the atmosphere is avoided; said method comprising the steps of supplying warm water to be cooled to a first group of the gaps in the contact body while supplying cooling air to substantially all of the gaps in the cooling body whereby the temperature and moisture content of air supplied to the gaps to which warm water is supplied are increased while the temperature of the air supplied to the other gaps is increased by heat transfer through adjacent layers of the contact body without substantially changing the moisture content thereof; and then mixing the warmed air from said first group of gaps with air from gaps to which only air was supplied before discharging the air to the atmosphere.

2. The method as defined in claim 1 including the step of controlling the number of gaps to which the warm water is supplied in accordance with the temperature of the air in the atmosphere.

3. The method as defined in claim 1 wherein said step of supplying warm water to some of the gaps in the cooling body comprises the step of supplying said warm water to alternate gaps whereby cooling air flowing in the gaps therebetween is heated by conduction through the adjacent contact body layers without a substantial change in moisture content.

4. An evaporative cooling device comprising a casing having cooling air inlet and outlet openings formed therein; a contact body positioned in said casing and formed from a plurality of contact layers defining a plurality of water and air flow gaps therebetween providing communication between said air inlet and outlet openings; means positioned above said contact body for supplying warm water to be cooled to only some of said gaps; and means for supplying cooling air from said inlet opening through substantially all of said gaps to said outlet opening, whereby the temperature and moisture content of air supplied to the gaps to which warm water is supplied are increased while the temperature of air supplied to the other gaps is increased by heat transfer through adjacent layers of the contact body without substantially changing the moisture content thereof.

5. The device as defined in claim 4 wherein said gaps are formed between adjacent layers of the contact body and said layers have upper inlet wall portions between which the warm water is supplied; said means for supplying the warm water supplying the water to selectively spaced gaps such that the gaps having no water therein are adjacent to at least one gap having warm water flowing therethrough whereby cooling air flowing therein is heated by conduction through the contact body separating the gaps without a substantial change in moisture content.

6. The device as defined in claim 5 wherein said means for supplying warm water to said gaps comprises at least two groups of pipe channels disposed above the gaps of the contact body with the channels of one group being located between the channels of the other group.

7. The device as defined in claim 6 wherein each channel group is connected to a separate distributor duct for the warm water.

* * * * *